US009739215B2

(12) United States Patent
Martin et al.

(10) Patent No.: US 9,739,215 B2
(45) Date of Patent: Aug. 22, 2017

(54) INTRUSIVE EGR MONITOR FOR A HYBRID VEHICLE

(71) Applicant: Ford Global Technologies, LLC, Dearborn, MI (US)

(72) Inventors: Douglas Raymond Martin, Canton, MI (US); Richard Paul Taylor, Sterling Heights, MI (US); Freeman Gates, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 484 days.

(21) Appl. No.: 13/835,673

(22) Filed: Mar. 15, 2013

(65) Prior Publication Data

US 2014/0261343 A1    Sep. 18, 2014

(51) Int. Cl.
| | |
|---|---|
| *F02D 21/08* | (2006.01) |
| *F02D 41/00* | (2006.01) |
| *F02D 41/24* | (2006.01) |
| *F02D 29/02* | (2006.01) |
| *B60W 20/50* | (2016.01) |

(Continued)

(52) U.S. Cl.
CPC ............ *F02D 21/08* (2013.01); *B60W 20/16* (2016.01); *B60W 20/50* (2013.01); *F02D 29/02* (2013.01); *F02D 41/0077* (2013.01); *F02D 41/2451* (2013.01); *F02M 26/49* (2016.02); *B60W 2050/021* (2013.01); *B60W 2050/022* (2013.01); *B60Y 2400/442* (2013.01); *F02D 2200/0402* (2013.01); *F02D 2200/0406* (2013.01); *F02D 2200/0408* (2013.01); *Y02T 10/47* (2013.01); *Y10S 903/905* (2013.01)

(58) Field of Classification Search
CPC ........... F02M 25/0702; F02M 25/0772; F02M 25/0773; F02M 25/07; F02D 21/08
USPC ............ 123/568.11, 568.16, 568.21, 568.24, 123/90.15, 90.16, 90.17; 701/108
See application file for complete search history.

(56) References Cited

U.S. PATENT DOCUMENTS

| | | | | |
|---|---|---|---|---|
| 4,142,493 A | * | 3/1979 | Schira ................ | F02D 41/0077 123/486 |
| 4,173,205 A | * | 11/1979 | Toelle ................ | F02D 41/0052 123/568.22 |

(Continued)

FOREIGN PATENT DOCUMENTS

| | | |
|---|---|---|
| CN | 101849093 A | 9/2010 |
| CN | 102470858 A | 5/2012 |

OTHER PUBLICATIONS

Chinese Office Action in corresponding Chinese application 201410098833.6 issued by SIPO on May 1, 2017.

*Primary Examiner* — Hung Q Nguyen
*Assistant Examiner* — Xiao Mo
(74) *Attorney, Agent, or Firm* — David Kelley; Brooks Kushman P.C.

(57) ABSTRACT

A system and method for controlling an exhaust gas recirculation (EGR) system in a hybrid vehicle using an intrusive monitor include adjusting EGR flow through an EGR valve based on an average pressure difference between pressure measured from a manifold absolute pressure (MAP) sensor and inferred pressure determined from mass air flow (MAF) into an intake of an engine when engine speed, throttle and camshaft timing position change is below a corresponding threshold. The measured pressure and inferred pressure are determined when the EGR valve is in a closed position and an open position.

20 Claims, 6 Drawing Sheets

(51) Int. Cl.
*B60W 20/16* (2016.01)
*F02M 26/49* (2016.01)
*B60W 50/02* (2012.01)

(56) References Cited

U.S. PATENT DOCUMENTS

| | | | |
|---|---|---|---|
| 6,164,270 A | 12/2000 | Bidner | |
| 6,257,214 B1* | 7/2001 | Bidner | F02D 41/0055 123/568.16 |
| 6,850,834 B1* | 2/2005 | Yu | F02D 41/0072 123/568.16 |
| 8,136,391 B2 | 3/2012 | Martin et al. | |
| 8,874,353 B2 | 10/2014 | Shinagawa et al. | |
| 2002/0189562 A1* | 12/2002 | Iizuka | F01L 1/34 123/90.17 |
| 2003/0029233 A1* | 2/2003 | Ting | F02D 41/0072 73/114.76 |
| 2012/0203411 A1 | 8/2012 | Mallebrein et al. | |

\* cited by examiner

INTRUSIVE EGR MONITOR FOR A HYBRID VEHICLE

TECHNICAL FIELD

The present disclosure relates to systems and methods for monitoring exhaust gas recirculation systems in hybrid vehicles.

BACKGROUND

Exhaust gas recirculation (EGR) systems are employed in automotive vehicles to recirculate a controlled portion of the engine exhaust gas into an engine intake manifold to reduce emissions and improve fuel efficiency. Such systems typically employ an EGR valve that is disposed between the engine exhaust manifold and the engine intake manifold, and operable, when in an open position, to recirculate a portion of the exhaust gases from the exhaust side of the engine back to the intake side of the engine. In one arrangement, the EGR flow rate to the intake manifold is varied according to one or more conditions, such as engine temperature, air charge entering the intake manifold, and engine speed.

It is desirable to monitor operation of an EGR system through onboard diagnostic routines to determine whether or not the system is operating as expected. One approach to EGR monitoring in vehicles includes the use of a non-intrusive monitor. The non-intrusive EGR monitor requires operation at low load and high load with low amounts of EGR. These operating points are inefficient and as a result, hybrid engine operations typically avoid them, thus preventing the non-intrusive monitor from completing a diagnostic test. In contrast, an intrusive monitor only needs the highly efficient medium load points to complete a diagnostic test. However, in hybrid vehicles, the test results can be corrupted by intake variable camshaft timing (VCT) operation.

An EGR onboard diagnostic routine can be confounded by rapid VCT adjustments. A rapid change in VCT causes a manifold filling delay such that the mass air flow (MAF) into the intake manifold and the manifold absolute pressure (MAP) do not track each other. In non-hybrid vehicles, VCT is not employed aggressively, meaning that highly retarded valve timings are not used often and the rate of change in valve timing is typically modest. Thus, the problem of delay was not found to substantially impair the accuracy of the EGR onboard diagnostic routine in non-hybrid vehicles. Whereas, in hybrid vehicles, more aggressive use of VCT can be accommodated, both in highly retarded timings and rapid rates of change in valve timing. As such, there is a need to provide a robust and systematic means to monitor EGR systems in hybrid vehicles.

SUMMARY

A system and method for monitoring an exhaust gas recirculation (EGR) system in a hybrid vehicle using an intrusive monitor is disclosed. The system and method may include using measured manifold absolute pressure (MAP) and inferred MAP to determine EGR system operability. Embodiments may also include adjusting EGR flow through the EGR valve to compensate for clogging and EGR valve restriction. Embodiments of this disclosure may be used in various EGR control applications where improvement in detecting EGR system operability is desired.

In one embodiment, a hybrid vehicle includes an engine, a MAP sensor coupled to an intake manifold of the engine and a MAF sensor coupled to an inlet of the intake manifold of the engine. The hybrid vehicle also includes an EGR duct coupled to the intake manifold of the engine and an exhaust manifold of the engine, where the EGR duct has an EGR valve configured to recirculate exhaust gas from the exhaust manifold into the intake manifold of the engine. The hybrid vehicle further includes a controller in communication with the engine, the MAP sensor, the MAF sensor and the EGR valve. The controller is configured to increase EGR flow through the EGR valve when a sum of a first difference between a first and a second measured MAP and a second difference between a first and a second inferred MAP is below a first threshold. The controller is also configured to decrease EGR flow through the EGR valve when the sum of the first difference and the second difference exceeds a second threshold.

In another embodiment, a method for monitoring an EGR system in a hybrid vehicle includes increasing EGR flow through an EGR valve when a sum of a first difference between a first and a second measured MAP and a second difference between a first and a second inferred MAP is below a first threshold. The method also includes decreasing EGR flow through the EGR valve when the sum of the first difference and the second difference exceeds a second threshold. The first measured MAP and the second measured MAP may be based on a pressure signal produced by a sensor positioned in an intake manifold of an engine. Likewise, the first inferred MAP and the second inferred MAP may be based on mass air flow into the intake manifold of the engine measured from a sensor coupled to an inlet of the intake manifold. Additionally, the first measured MAP and the first inferred MAP are collected when the EGR valve is in an open position and the second measured MAP and the second inferred MAP are collected when the EGR valve is in a closed position.

In yet another embodiment, a method for monitoring an EGR system includes collecting a first and a second measured MAP and a first and a second inferred MAP when camshaft timing position change is below a corresponding threshold value. The method also includes storing a diagnostic code when a sum of a first difference between the first and the second measured MAPs and a second difference between the first and the second inferred MAPs is below a first threshold and greater than a second threshold. The method may further include incrementing an adaptive parameter by a predetermined factor to increase EGR flow when the sum is below a third threshold and decrementing the adaptive parameter by the predetermined factor to decrease EGR flow when the sum exceeds a fourth threshold. The method may include activating an indicator within vehicle when the sum of the first difference and the second difference is below the first threshold and greater than the second threshold. The indicator may be a light, a sound and/or a message.

Various embodiments according to the present disclosure may provide one or more associated advantages. For example, use of an intrusive EGR monitor according to embodiments of the present disclosure does not depend on operation of the engine at inefficient low-load and high-load operating points and is therefore more conducive to hybrid vehicle applications. Embodiments according to the present disclosure also avoid the complexity and potential inaccuracies associated with compensating measurements for VCT position by invalidating tests where VCT position changes near the end of the test.

The above advantages and other advantages and features will be readily apparent from the following detailed descrip-

DETAILED DESCRIPTION

As required, detailed embodiments of the claimed subject matter are disclosed herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ embodiments of the claimed subject matter.

Figure 1:
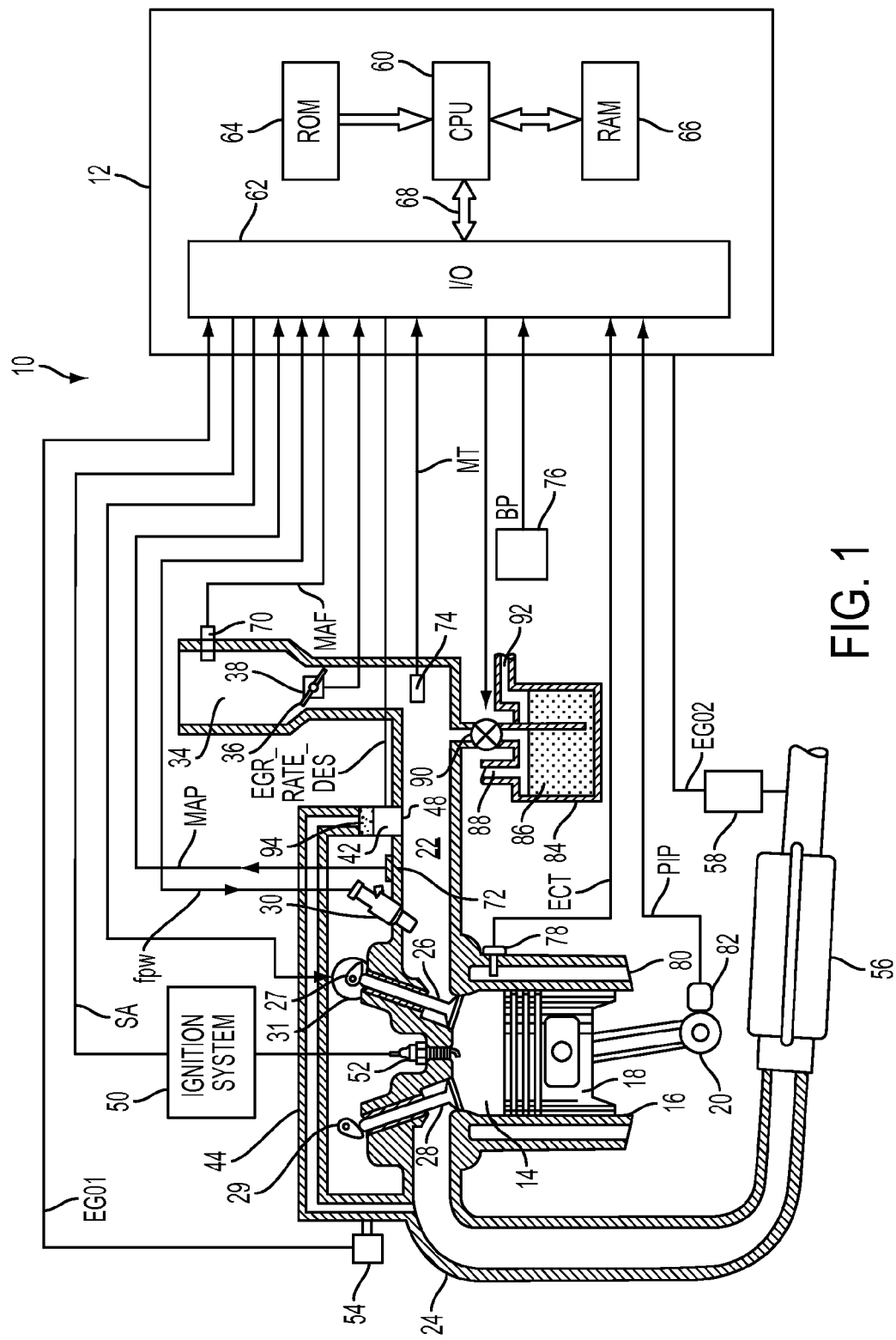
FIG. 1 is a schematic representation of a single cylinder of an internal combustion engine in accordance with embodiments of the present disclosure.

Referring to FIG. 1, an internal combustion engine 10 is shown having a plurality of cylinders, one cylinder of which is shown in FIG. 1, controlled by controller 12. Controller 12 may be implemented by an engine control unit (ECU) and/or a powertrain control module (PCM), for example. Controller 12 is shown in FIG. 1 as a conventional microcomputer including: microprocessor unit (CPU) 60, input/output ports 62, read-only memory (ROM) 64, random access memory (RAM) 66, and a conventional data bus 68. Controller 12 is shown receiving various signals from sensors coupled to engine 10, in addition to those signals previously discussed, including: a mass air flow (MAF) from mass flow sensor 70 coupled to intake manifold 22 before throttle 38; a measurement of manifold absolute pressure (MAP) from pressure sensor 72; an intake manifold temperature (MT) signal from temperature sensor 74; an engine coolant temperature (ECT) from temperature sensor 78 coupled to cooling sleeve 80; and a profile ignition pickup (PIP) signal from Hall effect sensor 82 coupled to crankshaft 20 and used as an engine speed signal producing a predetermined number of equally spaced pulses every revolution of the crankshaft. Also included is a barometer 76 for measuring barometric pressure, BP.

Engine 10 includes combustion chamber 14 and cylinder walls 16 with piston 18 positioned therein and connected to crankshaft 20. Combustion chamber 14 is shown communicating with intake manifold 22 and exhaust manifold 24 via respective intake valve 26 and exhaust valve 28. A cam 29, which is part of a camshaft, not shown, actuates exhaust valve 28 when the tip of cam 29 presses down on exhaust valve 28. Similarly, cam 29 actuates intake valve 27. The timing of intake valve 27 can be varied by a variable camshaft timing (VCT) device 31.

Intake manifold 22 may have a fuel injector 30 coupled thereto for delivery of fuel to engine cylinders. Fuel is delivered to fuel injector 30 by a conventional fuel system (not shown) including a fuel tank, fuel pump, and fuel rail. Alternatively, the engine may be configured such that the fuel is injected directly into the cylinder of the engine, which is known to those skilled in the art as a direct-injection engine. Intake manifold 22 communicates with throttle body 34 via throttle plate 36. Throttle position sensor 38 measures the angular position of throttle plate 36 and transmits a throttle position signal indicative of the angular position of throttle plate 36 to controller 12.

Ignition system 50 provides ignition spark to combustion chamber 14 via spark plug 52. Two-state exhaust gas oxygen sensors 54, 58 are shown coupled to exhaust manifold 24 upstream and downstream of catalytic converter 56, respectively. Sensors 54 and 58 provide signals EGO1 and EGO2, respectively, to controller 12 which may convert these signals into two-state signals, one state indicating exhaust gases are rich of a reference air/fuel ratio and the other state indicating exhaust gases are lean of the reference air/fuel ratio.

A carbon canister 84 is coupled to the intake 22 via a purge valve 90. Fuel vapors, which are displaced from the fuel tank during filling (not shown), enter carbon canister 84 through inlet 88. The fuel is absorbed onto carbon pellets 86 in carbon canister 84 and air is released to the atmosphere through opening 92. When engine 10 is operating, valve 90 can be opened. Vacuum in intake 22 draws atmospheric air through carbon canister 84 through opening 92. The atmospheric air strips the fuel vapors from carbon pellets 86 into intake 22 and into combustion chamber 14 to be combusted. In such a manner, carbon canister 84 is purged so that carbon pellets 86 can absorb fuel vapor when air laden with fuel vapors are introduced into carbon canister 84 during a refueling event. In one embodiment, purge valve 90 is a solenoid valve, which can be commanded to assume a position in between fully open and fully closed by providing a pulse width modulated signal. Based on the command to valve 90, and a pressure difference between intake 22 and atmospheric pressure (BP), an amount of air inducted into engine 10 through carbon canister 84 can be estimated.

Engine 10 also includes an exhaust gas recirculation (EGR) system for recirculating a controlled portion of exhaust gas generated by the engine 10 from an exhaust manifold 24 into the intake manifold 22 via an EGR duct 44. The amount of exhaust gas which is recirculated from the exhaust manifold to the intake manifold may be controlled by a conventional DC stepper motor driven EGR valve 42 having a stepper motor 94 that receives signals, EGR_RATE_DES, from controller 12 to axially move the EGR valve 42 in incremental steps in a manner to control its position relative to an inlet 48 communicating with the intake manifold 22.

MAF sensor 70 is disposed upstream of inlet 48 to intake manifold 22 and MAP sensor 72 is disposed downstream of inlet 48. MAF sensor 70 measures only fresh air supplied to engine 10, i.e., does not measure EGR flow. However, a signal from MAP sensor 72 is affected by EGR. An inferred MAP may be computed based on the signal from MAF sensor 70, a PIP signal indicating engine rpm, and engine displacement (known). The measured MAP (pressure measured from a MAP sensor) and the inferred MAP may be used to determine whether the EGR system is properly working. A method of inferring the pressure in the intake manifold based on mass air flow is also disclosed in U.S. Pat. Nos. 5,654,501 and 5,331,936 assigned to the assignee of the present disclosure and incorporated herein by reference.

Figure 2:
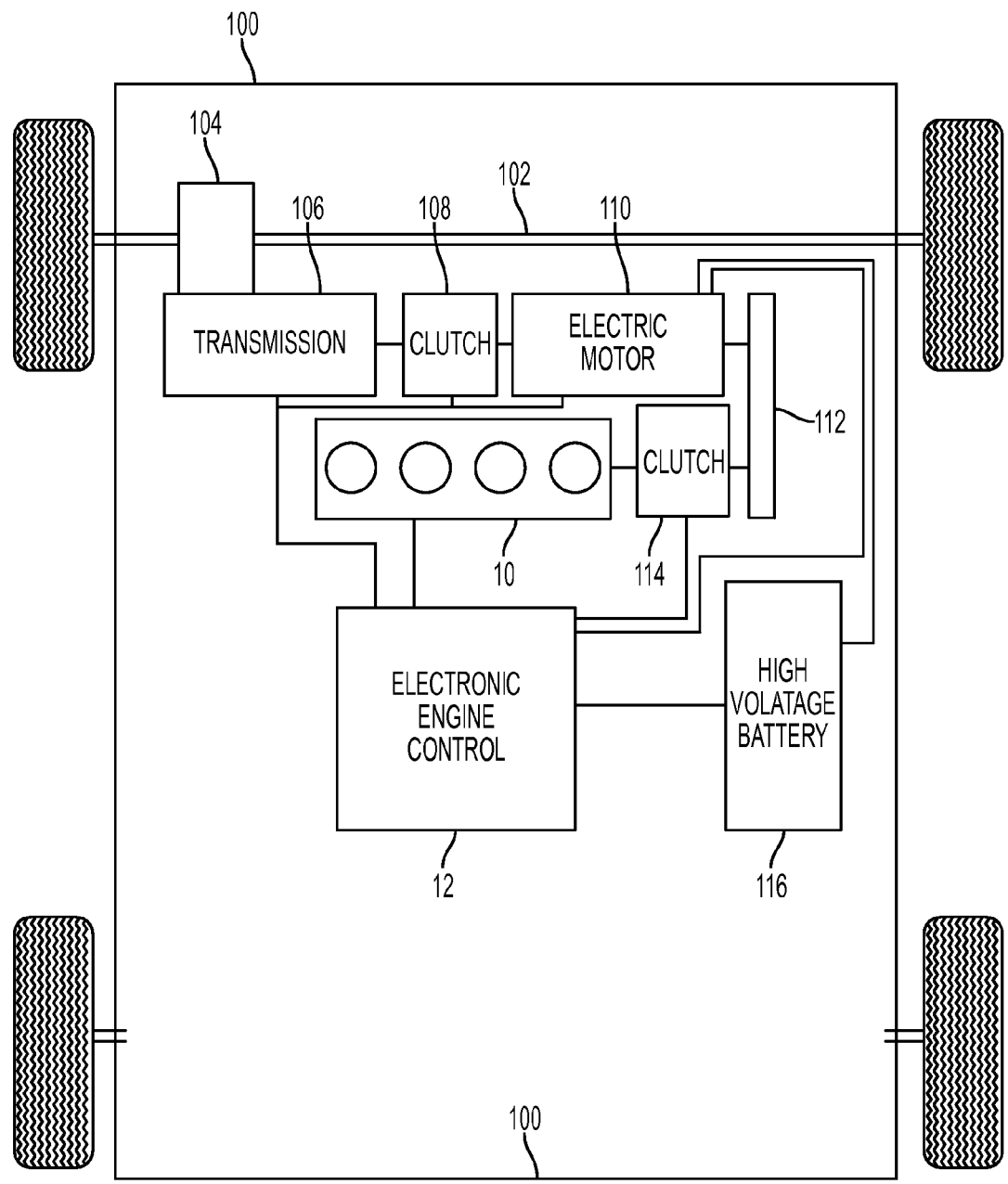
FIG. 2 is a schematic representation of a hybrid electric vehicle (HEV) including both an electric motor and internal combustion engine for propulsion in accordance with embodiments of the present disclosure.

Engine 10, as shown in FIG. 1, may be part of a powertrain system for a hybrid electric vehicle (HEV) 100, as shown schematically in FIG. 2. Front wheels are coupled to a front axle 102. A differential and final drive gear set 104 are also coupled to front axle 102. The vehicle powertrain system is coupled to differential 104 via a transmission 106. Transmission 106 is coupled to an electric motor 110 via a clutch 108. Electric motor 110 is coupled to engine 10 via a clutch 114. In the embodiment shown in FIG. 2, a chain drive 112 is provided between engine 10 and electric motor 110 such that engine 10 rotates along a first axis and electric motor 110 and transmission 106 rotate along a second axis substantially parallel to the first axis. Electric motor 110 can operate as a motor providing torque to the associated axle or as generator absorbing torque from the associated axle, i.e., providing a braking force on wheels associated with the axle. Electric motor 110 is coupled to high voltage battery 116, which acts as a source and sink for electrical energy. Controller 12 is shown coupled to engine 10, transmission 106, electrical motor 110, clutch 114, and high voltage battery 116. The configuration in FIG. 2 illustrates simply one HEV configuration. There are many alternatives for configuring an HEV which do not depart from the scope of the present disclosure.

It is desirable to monitor operation of the EGR system to determine whether or not the system is operating as expected. In addition, effective EGR monitoring systems and methods are helpful in determining when the EGR valve is starting to become restricted. Increased clogging or EGR valve restriction is a consequence of operating the engine with EGR at a colder temperature, which is typical for increased fuel economy in hybrids. The EGR flow rate through the EGR valve can be adjusted to prolong the life of the EGR valve. Overall EGR system functionality may be determined by using the various systems and methods described below.

Figure 3A:
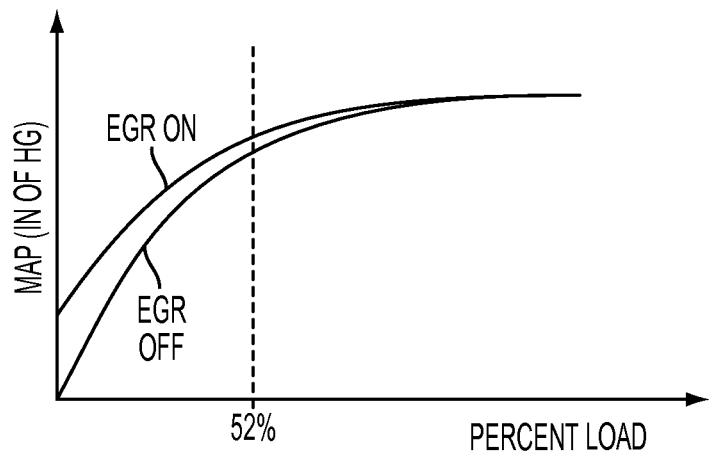
FIG. 3A is a plot of manifold absolute pressure (MAP) and load with EGR ON and EGR OFF in accordance with embodiments of the present disclosure.
Figure 3B:
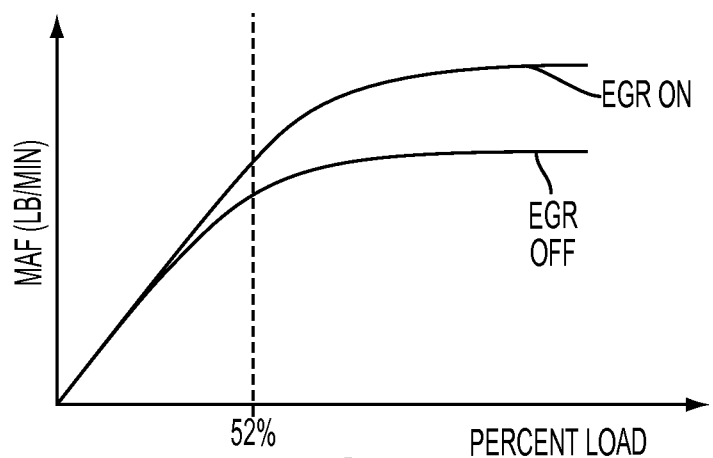
FIG. 3B is a plot of mass air flow (MAF) through an intake of the engine and load with EGR ON and EGR OFF in accordance with embodiments of the present disclosure.

Referring to FIG. 3A, as the percent load (MAP/BP) increases (i.e., as manifold absolute pressure (MAP) approaches barometric pressure (BP)), the difference in the measured MAP with EGR OFF versus EGR ON approaches zero. In other words, at high loads the MAP sensor data alone does not provide an accurate indication of system operability. One solution is to use both measured MAP and inferred MAP data to determine operability of the EGR system. As described above, measured MAP can be determined from a signal transmitted by a MAP sensor and inferred MAP can be computed from a signal from a MAF sensor, a PIP signal indicating engine rpm, and engine displacement. As shown in FIG. 3B, the MAF measured with the EGR ON is substantially different from MAF measured with the EGR OFF as the percent load increases. Essentially, the addition of EGR under low load substantially changes MAP but does not significantly change MAF; whereas, the addition of EGR under high load does not significantly change MAP but does significantly change MAF.

Figure 4A:
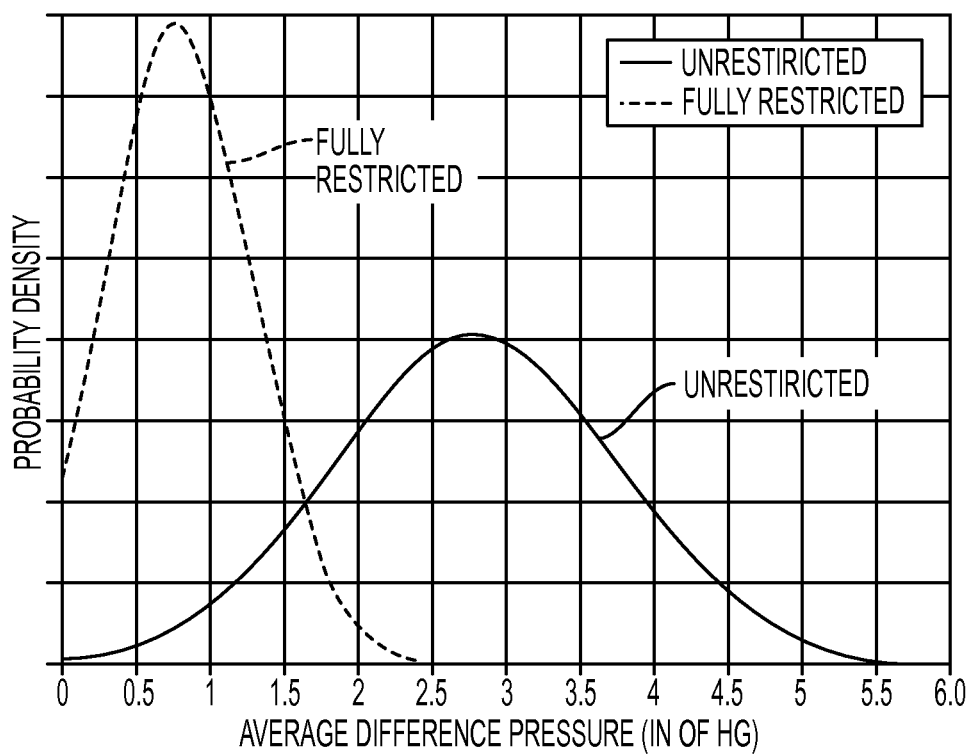
FIGS. 4A and 4B are plots illustrating average pressure difference between a functional and non-functional EGR system in accordance with embodiments of the present disclosure.
Figure 4B:
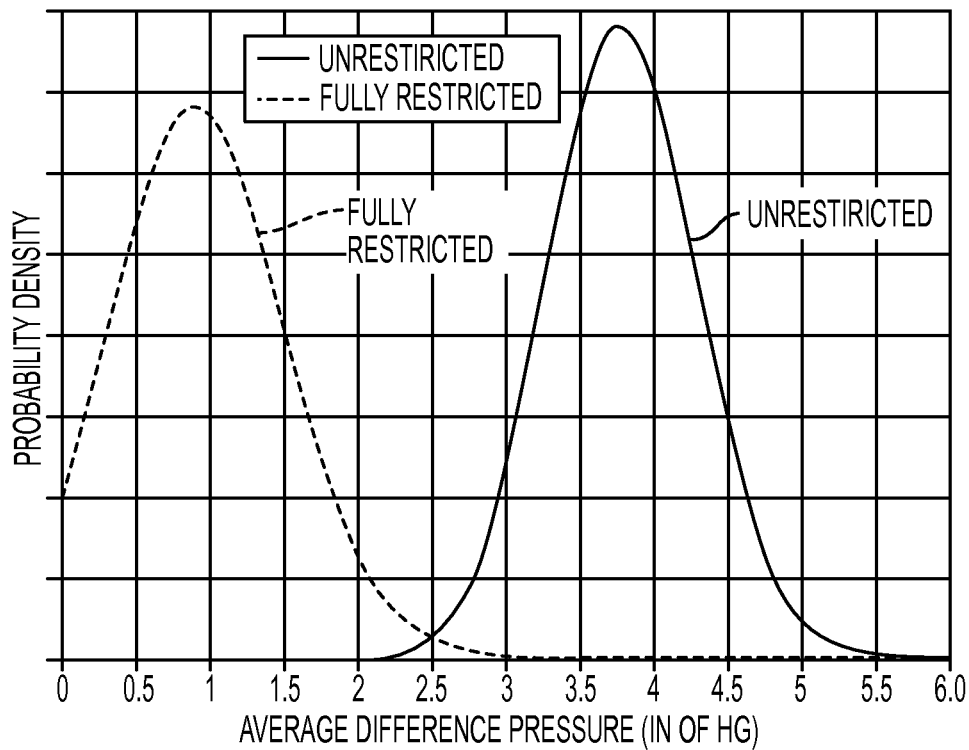

Referring to FIG. 4A, a plot illustrating the average pressure difference between a functional (unrestricted curve) and non-functional (fully restricted curve) EGR system when measured MAP is the sole source of data is shown. It can be seen that both functional and non-functional EGR systems could have values between 0.5 and 2.0 inches of Hg. This may result in an inaccurate indication of EGR system operating status, which may lead to unnecessary trips to service facilities and customer dissatisfaction. In accordance with embodiments of the present disclosure, one solution to this problem is to add the average pressure difference between measured MAP determined with the EGR ON and OFF to the average pressure difference between inferred MAP computed with the EGR ON and OFF. By adding the two average pressure differences, the overlapping area shown in FIG. 4A can be substantially reduced, as shown in the plot of FIG. 4B, which in turn improves the accuracy of EGR system status indicators.

Figure 5A:
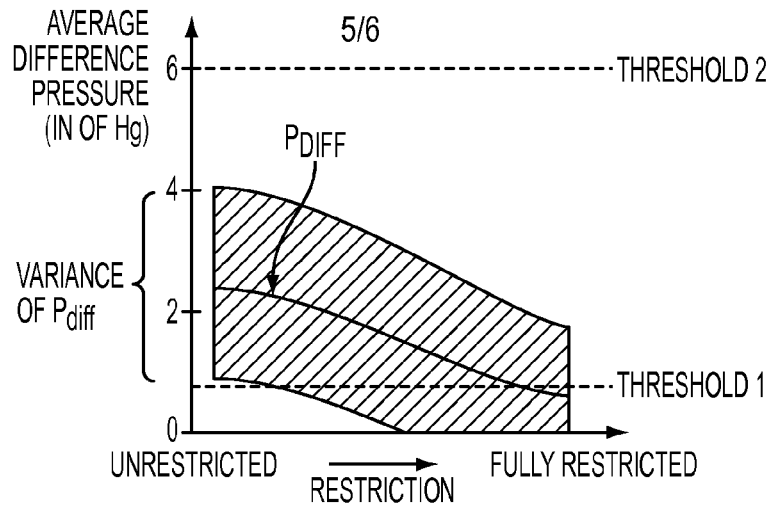
FIGS. 5A, 5B and 5C illustrate the relationship between variance (noise), measured MAP and inferred MAP in accordance with embodiments of the present disclosure.
Figure 5B:
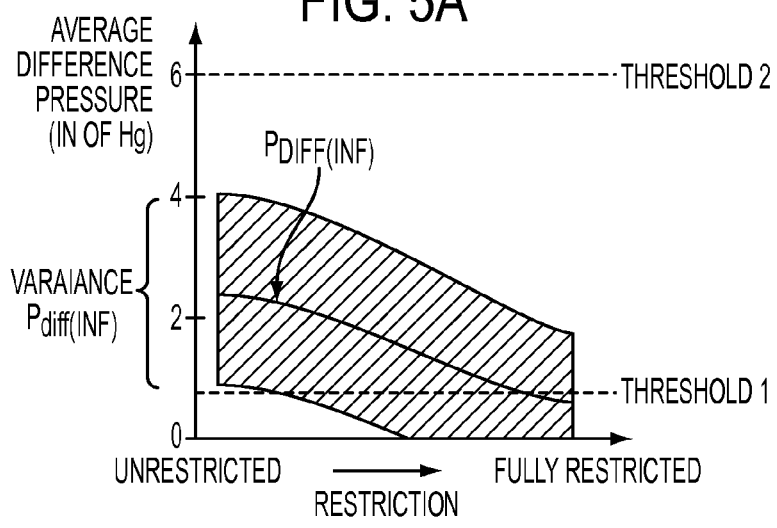
Figure 5C:
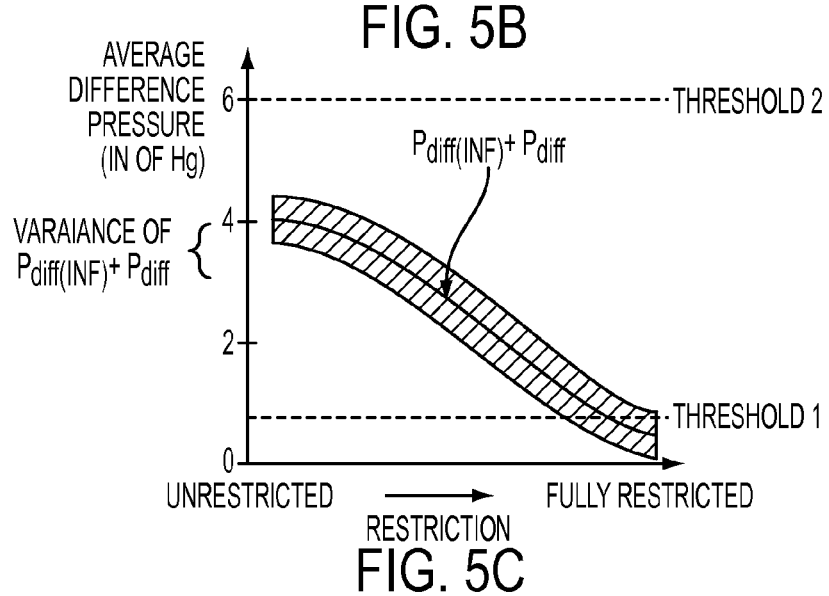

This control strategy is further illustrated in FIGS. 5A-5C where the variance or noise in the pressure difference data using measured MAP and inferred MAP is shown. As shown in FIGS. 5A and 5B, when using the average pressure difference from either measured MAP or inferred MAP, the variance or noise is substantial over the range from an unrestricted to a fully restricted EGR passage. Whereas, when the average pressure difference from both measured MAP and inferred MAP are added, variance or noise is substantially reduced as is depicted in FIG. 5C. The reduction in variance makes it less likely that normal operation of the EGR system will result in an inaccurate diagnostic code or other indicator being triggered from a pressure difference between EGR ON and EGR OFF that is within an interval established by a first pressure threshold and a second pressure threshold.

Further, the EGR position and corresponding flow rate may be adjusted to compensate for any clogging or restriction in the EGR valve and/or EGR duct. A desired EGR valve position may be determined from an EGR valve transfer function, FN_EGRPOS, that is based on a ratio of pressure across the EGR valve and a desired EGR mass flow rate. In particular, the required number of motor steps to achieve a desired EGR flow rate may be determined by looking up motor output step values from a table corresponding to the EGR valve transfer function. See, for example, the table set forth below.

| Output of table is EGR position (steps) | | | | | | | Output of table is EGR mass (lbs/min) | | | | |
|---|---|---|---|---|---|---|---|---|---|---|---|
| 0.6 | 52 | 52 | 52 | 52 | 52 | 52 | 0.6 | 0.6 | 0.6 | 0.3 | 0 |
| 0.4 | 30 | 30 | 30 | 52 | 52 | 40 | 0.5 | 0.5 | 0.5 | 0.25 | 0 |
| 0.3 | 23 | 23 | 23 | 52 | 52 | 30 | 0.4 | 0.4 | 0.4 | 0.2 | 0 |
| 0.2 | 18 | 18 | 18 | 30 | 52 | 20 | 0.25 | 0.25 | 0.25 | 0.15 | 0 |
| 0.1 | 10 | 10 | 10 | 18 | 52 | 10 | 0.1 | 0.1 | 0.1 | 0.06 | 0 |
| 0 | 0 | 0 | 0 | 0 | 0 | 5 | 0 | 0 | 0 | 0 | 0 |
|  | 0 | 0.25 | 0.5 | 0.75 | 0 |  | 0 | 0.25 | 0.5 | 0.75 | 1 |
|  | FN_EGRPOS | | | | | | FN_EGRMAS | | | | |

The table values are determined empirically by dynamometer engine tests. In the table, the ratio of pressure across the valve, egr_pres_rat, is on the horizontal axis and the desired EGR flow rate is on the vertical axis. Also, in the table, the output values of the actual EGR mass flow, FN_EGRMASS, are shown with egr_pres_rat on the horizontal axis and EGR valve position on the vertical axis. The output table is clipped as necessary to a maximum value corresponding to the total steps the motor is capable of making (e.g., 52 steps). The desired EGR valve position may be adjusted by adding an adaptive parameter, egr_ step_adapt, to the EGR valve transfer function to compensate for any EGR valve restriction. As a result, the normal EGR valve movement can be increased or decreased depending on current engine conditions. A method describing use of an EGR valve transfer function to obtain a desired EGR position is disclosed in greater detail in U.S. Pat. No. 6,098,602 assigned to the assignee of the present disclosure and incorporated herein by reference.

Figure 6:
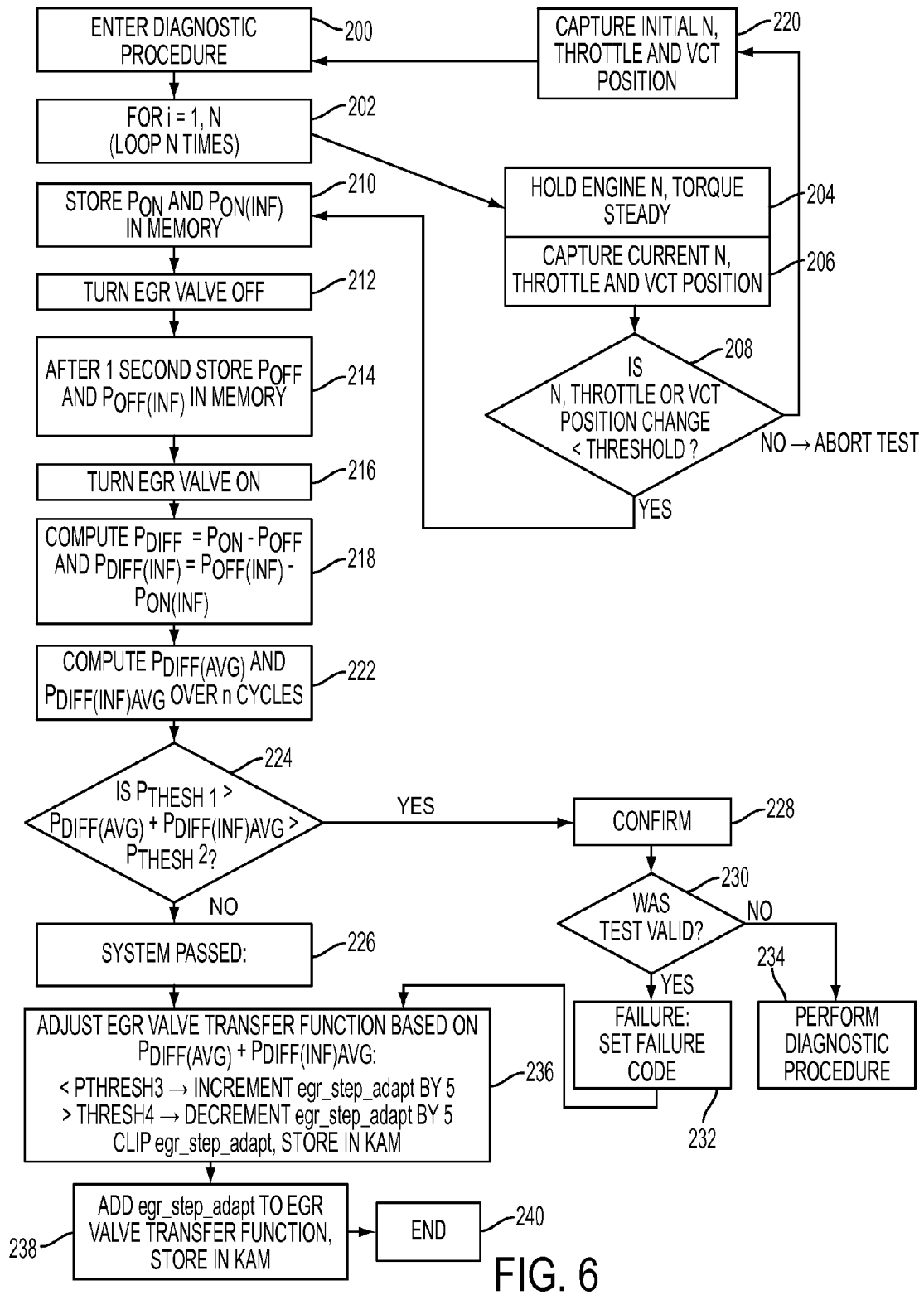
FIG. 6 is a flowchart illustrating a control system and/or method for monitoring an EGR system in a hybrid vehicle in accordance with an embodiment of the present disclosure.

Referring to FIG. 6, a flowchart describing operation of an EGR monitoring system for a hybrid vehicle in accordance with an exemplary embodiment of the present disclosure is shown. As those of ordinary skill in the art will understand, the functions represented in FIG. 6 may be performed by software and/or hardware depending on the particular application and implementation. The various functions may be performed in an order or sequence other than illustrated in FIG. 6 depending upon the particular processing strategy, such as event-driven, interrupt-driven, etc. Similarly, one or more steps or functions may be repeatedly performed, performed in parallel, and/or omitted under particular operating conditions or in particular applications, although not explicitly illustrated. In one embodiment, the functions illustrated are primarily implemented by software, instructions, or code stored in a computer readable storage device and executed by one or more microprocessor-based computers or controllers to control operation of the vehicle.

More specifically, in FIG. 6, a controller initiates a diagnostic test at 200. The controller sets the test at 204 to collect multiple values of measured MAP and inferred MAP over a predetermined number of loops, n. The controller then determines whether engine conditions are suitable to continue the diagnostic routine as shown in blocks 204-208; and if so, the data is collected a number of times, as indicated in blocks 210-218 and averaged at block 216. Engine conditions include holding engine speed and torque steady 204, capturing current engine speed, throttle and VCT position 206 and verifying that a change in engine speed, throttle position and VCT is below a corresponding threshold 208. If a change in engine speed, throttle position or VCT exceeds a corresponding threshold at 208, then the diagnostic test is aborted. The test then captures or stores the initial engine speed, throttle position and VCT at 220 and returns to the beginning of the test at 200.

Measured MAP ($P_{ON}$) and inferred MAP ($P_{ON(INF)}$) data are collected with the EGR valve open at 210 when engine conditions are met at 208. The EGR valve is then closed at 212 and measured MAP ($P_{OFF}$) and inferred MAP ($P_{OFF(INF)}$) data are then collected at 214. The EGR valve is opened again at 216. The pressure difference between the measured MAP with the EGR OFF and ON ($P_{diff}=P_{ON}-P_{OFF}$) and the pressure difference between inferred MAP with the EGR OFF and ON ($P_{diff(INF)}=P_{ON(INF)}-P_{OFF(INF)}$) are computed at 218. The process is repeated for a predetermined number of times (n loops) as long as engine conditions are sustained. After the data has been collected over the specified interval, the controller computes the average difference in measured MAP ($P_{diff(AVG)}$) and inferred MAP ($P_{diff(INF)AVG}$) over the interval (n cycles) at 222.

If the sum of the average difference in measured MAP and inferred MAP ($P_{diff(AVG)}+P_{diff(INF)AVG}$) is less than a first threshold ($P_{THRESH1}$) and greater than a second threshold ($P_{THRESH2}$) at block 224, then an EGR system operating status is validated at 228 and 230. If engine conditions remained sufficiently constant during the test, then the test is considered valid by decision block 230 and a diagnostic code corresponding to the operating status is set at block 232. If engine conditions do not remain substantially constant, then the diagnostic procedure is performed again as indicated in block 234 Various other control actions may be performed based on the diagnostic code set or stored at 232 such as activating an indicator within the vehicle to alert a driver using a light, sound, and/or message, for example, and/or adjusting the EGR valve transfer function at 236 as explained in greater detail below.

If the sum is not within the interval bounded by the first and the second threshold, then the diagnostic routine is exited at block 226 and control continues with block 236. The controller adjusts the EGR flow rate based on the sum of the average difference of measured MAP and inferred MAP ($P_{diff(AVG)}+P_{diff(INF)AVG}$) as shown at blocks 236 and 238. When the test results show that the EGR valve is starting to become restricted, the EGR flow rate is increased. More specifically, if the sum of the average pressure differences ($P_{diff(AVG)}+P_{diff(INF)AVG}$) is below a third threshold, then the EGR flow rate may be increased by incrementing egr_step_adapt by a predetermined factor (e.g., by 5) 236 and adding it to EGR valve transfer function 238. Likewise, if the sum of the average pressure differences exceeds a fourth threshold, then the EGR flow rate may be decreased by decrementing egr_step_adapt by a predetermined factor (e.g., by 5) and adding it to EGR valve transfer function 238. The parameter egr_step_adapt may be clipped to a maximum value corresponding to the total steps of the motor and stored in the KAM 238. After adjusting the EGR flow rate, the diagnostic test ends at 240. By adjusting the flow of exhaust gases through the EGR valve into the intake manifold, the life of the EGR valve may be extended.

As such, use of an intrusive EGR monitor according to embodiments of the present disclosure does not depend on operation of the engine at inefficient low-load and high-load operating points and is therefore more conducive to hybrid vehicle applications. Embodiments according to the present disclosure also avoid the complexity and potential inaccuracies associated with compensating measurements for VCT position by invalidating tests where VCT position changes near the end of the test.

It is to be understood that the invention is not limited to the exact EGR control methods which have been illustrated and discussed in this disclosure, but that various modifications may be made without departing from the spirit and the scope of the invention.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure. While the best mode has been described in detail, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments discussed herein that are described as less desirable than other embodiments or prior art implementations with respect to one or more characteristics are not outside the scope of the disclosure and may be desirable for particular applications.

What is claimed is:

1. A method for controlling an EGR system in a hybrid vehicle, comprising:
    increasing EGR flow through an EGR valve responsive to a sum of a first difference between a first and a second measured MAP and a second difference between a first and a second inferred MAP being below a first threshold; and
    decreasing EGR flow through the EGR valve in response to the sum exceeding a second threshold different from the first threshold.

2. The method of claim 1, wherein the first measured MAP and the second measured MAP are based on a pressure signal produced by a sensor positioned in an intake manifold of an engine.

3. The method of claim 1, wherein the first inferred MAP and the second inferred MAP are based on mass air flow into an intake manifold of an engine measured from a sensor coupled to an inlet of the intake manifold.

4. The method of claim 1, wherein the first measured MAP and the first inferred MAP are collected when the EGR valve is in an open position and the second measured MAP and the second inferred MAP are collected when the EGR valve is in a closed position.

5. The method of claim 4, wherein the first measured MAP, the second measured MAP, the first inferred MAP and the second inferred MAP are collected and averaged over a predetermined number of cycles.

6. The method of claim 5, wherein the first measured MAP, the second measured MAP, the first inferred MAP and the second inferred MAP are collected and averaged when entry conditions are sustained.

7. The method of claim 6, wherein entry conditions include the following:
    1) engine speed being held substantially steady,
    2) engine torque being held substantially steady,
    3) an engine speed change being below a corresponding threshold value,
    4) a throttle change being below a corresponding threshold value, and
    5) a camshaft timing position change being below a corresponding threshold value.

8. A method comprising:
    storing measured and inferred MAP values responsive to camshaft timing position change being below a corresponding threshold;
    storing a diagnostic code responsive to a sum of a difference between first and second measured MAP values and a second difference between first and second inferred MAP values being between first and second thresholds; and
    incrementing and decrementing an adaptive parameter to control increasing and decreasing of EGR flow, respectively, based on the sum relative to a third threshold and a fourth threshold different from the third threshold.

9. The method of claim 8, wherein the first measured MAP value and the first inferred MAP value are stored in response to an EGR valve being in an open position and the second measured MAP value and the second inferred MAP value are stored in response to the EGR valve being in a closed position.

10. The method of claim 8, further comprising:
    incrementing an adaptive parameter by a predetermined factor to increase EGR flow in response to the sum being below the third threshold; and
    decrementing the adaptive parameter by the predetermined factor to decrease EGR flow in response to the sum exceeding the fourth threshold.

11. The method of claim 8, further comprising:
    activating an indicator to alert a driver in response to the sum of the first difference and the second difference being below the first threshold, wherein the indicator is at least one of a light, a sound and a message.

12. A hybrid vehicle, comprising:
    an engine;
    a MAP sensor coupled to an intake manifold of the engine;
    a MAF sensor coupled to an inlet of the intake manifold of the engine;
    an EGR duct coupled to the intake manifold of the engine and an exhaust manifold of the engine, the EGR duct having an EGR valve configured to recirculate exhaust gas from the exhaust manifold into the intake manifold of the engine; and
    a controller in communication with the engine, the MAP sensor, the MAF sensor and the EGR valve, the controller being configured to increase EGR flow through the EGR valve in response to a sum of a first difference between a first and a second measured MAP and a second difference between a first and a second inferred MAP being below a first threshold and to decrease EGR flow through the EGR valve in response to the sum of the first difference and the second difference exceeding a second threshold different from the first threshold.

13. The hybrid vehicle of claim 12, wherein the first measured MAP and the second measured MAP are based on a pressure signal transmitted from the MAP sensor.

14. The hybrid vehicle of claim 12, wherein the first inferred MAP and the second inferred MAP are based on mass air flow into the intake manifold of the engine measured by the MAF sensor.

15. The hybrid vehicle of claim 12, wherein the first measured MAP and the first inferred MAP are collected when the EGR valve is in an open position and the second measured MAP and the second inferred MAP are collected when the EGR valve is in a closed position.

16. The hybrid vehicle of claim 15, wherein the first measured MAP, the second measured MAP, the first inferred MAP and the second inferred MAP are collected and averaged over a predetermined number of cycles.

17. The hybrid vehicle of claim 16, wherein the first measured MAP, the second measured MAP, the first inferred MAP and the second inferred MAP are collected and averaged when entry conditions are sustained.

18. The hybrid vehicle of claim 17, wherein entry conditions include the following:
    1) engine speed being held substantially steady,
    2) engine torque being held substantially steady,
    3) an engine speed change being below a corresponding threshold value,
    4) a throttle change being below the corresponding threshold value, and
    5) a camshaft timing position change being below the corresponding threshold value.

19. The hybrid vehicle of claim 12, wherein the controller is further configured to store a diagnostic code when the sum of the first difference and the second difference is below a third threshold and greater than a fourth threshold.

20. The hybrid vehicle of claim 12, wherein the controller is further configured to activate an indicator within the vehicle when the sum of the first difference and the second difference is below a third threshold and greater than a fourth threshold, wherein the indicator is at least one of a light, a sound and a message.

* * * * *